(12) United States Patent
Stevens

(10) Patent No.: US 7,242,290 B2
(45) Date of Patent: Jul. 10, 2007

(54) TESTING METHODS FOR USE WITH BOXES

(75) Inventor: John K Stevens, Toronto (CA)

(73) Assignee: Visible Assets, Inc. (CA)

( * ) Notice: Subject to any disclaimer, the term of this patent is extended or adjusted under 35 U.S.C. 154(b) by 392 days.

(21) Appl. No.: 10/711,334

(22) Filed: Sep. 10, 2004

(65) Prior Publication Data

US 2005/0245195 A1 Nov. 3, 2005
US 2006/0052060 A9 Mar. 9, 2006

Related U.S. Application Data

(62) Division of application No. 10/297,246, filed as application No. PCT/US01/18061 on Jun. 4, 2001, now Pat. No. 6,820,805.

(60) Provisional application No. 60/245,504, filed on Nov. 3, 2000, provisional application No. 60/228,555, filed on Aug. 28, 2000, provisional application No. 60/209,149, filed on Jun. 3, 2000.

(51) Int. Cl.
*G08B 29/00* (2006.01)

(52) U.S. Cl. ............ 340/514; 340/539.21; 455/67.7; 455/115.4

(58) Field of Classification Search ........ 340/514, 340/515, 539.16, 545.6, 569, 572.8, 573.4, 340/870.04, 539.21; 455/67.7, 67.11, 115.1–115.4, 455/90.2, 90.3, 575.7, 575.8; 324/600, 527
See application file for complete search history.

(56) References Cited

U.S. PATENT DOCUMENTS

| | | | |
|---|---|---|---|
| 2,088,806 A | 8/1937 | Ottman | |
| 3,130,395 A | 4/1964 | Simjian | |
| 3,591,194 A | 7/1971 | Vega | |
| 3,976,345 A | 8/1976 | Walters | |
| 4,048,926 A | 9/1977 | Brush, Jr. et al. | |
| 4,314,102 A | 2/1982 | Lowe et al. | |
| 4,596,203 A | 6/1986 | Lorek | |
| 4,683,459 A * | 7/1987 | Edson | 340/514 |
| 4,727,368 A | 2/1988 | Larson et al. | |
| 4,754,261 A * | 6/1988 | Marino | 340/514 |
| 4,795,424 A | 1/1989 | Burner | |
| 4,832,204 A | 5/1989 | Handy et al. | |
| 4,894,717 A | 1/1990 | Komei | |
| 4,940,963 A | 7/1990 | Gutman et al. | |
| 5,009,018 A | 4/1991 | Sebag | |
| 5,036,310 A | 7/1991 | Russell | |
| 5,074,135 A | 12/1991 | Eisermann | |
| 5,118,175 A | 6/1992 | Costello | |
| 5,153,561 A | 10/1992 | Johnson | |
| 5,190,213 A | 3/1993 | Horwitz | |
| 5,223,829 A | 6/1993 | Watabe | |

(Continued)

FOREIGN PATENT DOCUMENTS

GB 2 269 469 2/1994

(Continued)

*Primary Examiner*—Thomas Mullen
(74) *Attorney, Agent, or Firm*—Oppedahl Patent Law Firm LLC

(57) ABSTRACT

A method for testing the installation of a box includes the steps of closing the lid of the box, transmitting a signal from the box; noting the absence of an annunciation; and variously repositioning the box relative to a receiver, replacing a battery, or replacing the box.

3 Claims, 6 Drawing Sheets

U.S. PATENT DOCUMENTS

| | | | | |
|---|---|---|---|---|
| 5,247,282 A | | 9/1993 | Marshall | |
| 5,257,509 A | | 11/1993 | Harris | |
| 5,263,339 A | | 11/1993 | Evans | |
| 5,270,686 A | | 12/1993 | Martinez | |
| 5,397,986 A | * | 3/1995 | Conway et al. | 340/551 |
| 5,407,218 A | | 4/1995 | Jackson | |
| 5,416,466 A | * | 5/1995 | Malvaso et al. | 340/514 |
| 5,431,250 A | | 7/1995 | Schlamp | |
| 5,444,444 A | | 8/1995 | Ross | |
| 5,473,667 A | | 12/1995 | Neustein | |
| 5,475,378 A | | 12/1995 | Kaarsoo et al. | |
| 5,485,139 A | | 1/1996 | Tarnovsky | |
| 5,491,807 A | | 2/1996 | Freeman et al. | |
| 5,546,072 A | * | 8/1996 | Creuseremee et al. | 340/514 |
| 5,578,989 A | * | 11/1996 | Pedtke | 340/514 |
| 5,599,099 A | | 2/1997 | Bullivant | |
| 5,625,668 A | | 4/1997 | Loomis et al. | |
| 5,645,215 A | | 7/1997 | Marendt et al. | |
| 5,720,363 A | | 2/1998 | Kipp | |
| 5,732,400 A | | 3/1998 | Mandler et al. | |
| 5,774,053 A | | 6/1998 | Porter | |
| 5,786,748 A | | 7/1998 | Nikolic et al. | |
| 5,802,859 A | | 9/1998 | Zugibe | |
| 5,815,114 A | | 9/1998 | Speasl et al. | |
| 5,907,286 A | | 5/1999 | Kuma | |
| 5,942,985 A | | 8/1999 | Chin | |
| 5,966,663 A | | 10/1999 | Gleason | |
| 5,979,750 A | | 11/1999 | Kindell | |
| 5,987,421 A | * | 11/1999 | Chuang | 340/5.2 |
| 5,991,749 A | | 11/1999 | Morrill, Jr. | |
| 6,021,315 A | * | 2/2000 | Telewski | 455/67.11 |
| 6,070,793 A | | 6/2000 | Reichl et al. | |
| 6,087,933 A | * | 7/2000 | Addy et al. | 340/539.16 |
| 6,097,306 A | | 8/2000 | Leon et al. | |
| 6,134,557 A | | 10/2000 | Freeman | |
| 6,138,910 A | | 10/2000 | Madruga | |
| 6,144,916 A | | 11/2000 | Wood, Jr. et al. | |
| 6,148,291 A | | 11/2000 | Radican | |
| 6,150,936 A | * | 11/2000 | Addy | 340/514 |
| 6,204,763 B1 | | 3/2001 | Sone | |
| 6,323,782 B1 | | 11/2001 | Stephens et al. | |
| 6,480,758 B2 | | 11/2002 | Stevens | |
| 6,612,489 B2 | | 9/2003 | McCormick et al. | |
| 2001/0018672 A1 | | 8/2001 | Petters et al. | |
| 2001/0025257 A1 | | 9/2001 | Sato | |
| 2001/0042026 A1 | | 11/2001 | Hinh et al. | |
| 2001/0045450 A1 | | 11/2001 | Stevens | |
| 2002/0019781 A1 | | 2/2002 | Shooks et al. | |
| 2002/0029201 A1 | | 3/2002 | Barzilai et al. | |

FOREIGN PATENT DOCUMENTS

| | | |
|---|---|---|
| JP | 61224732 A * | 10/1986 |
| JP | 64-49505 | 2/1989 |
| WO | WO 01/27740 A1 | 4/2001 |
| WO | WO 01/95058 A2 | 12/2001 |
| WO | WO 02/19092 A1 | 3/2002 |
| WO | WO 02/067076 A2 | 8/2002 |

* cited by examiner

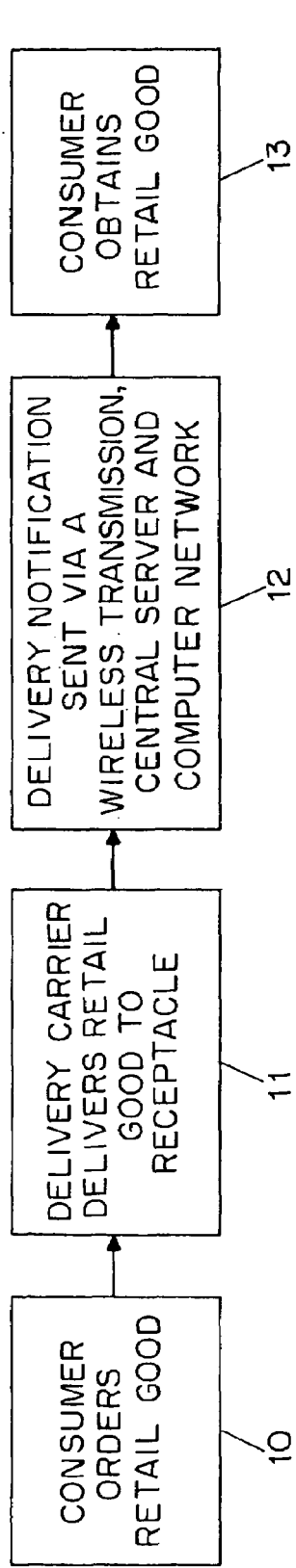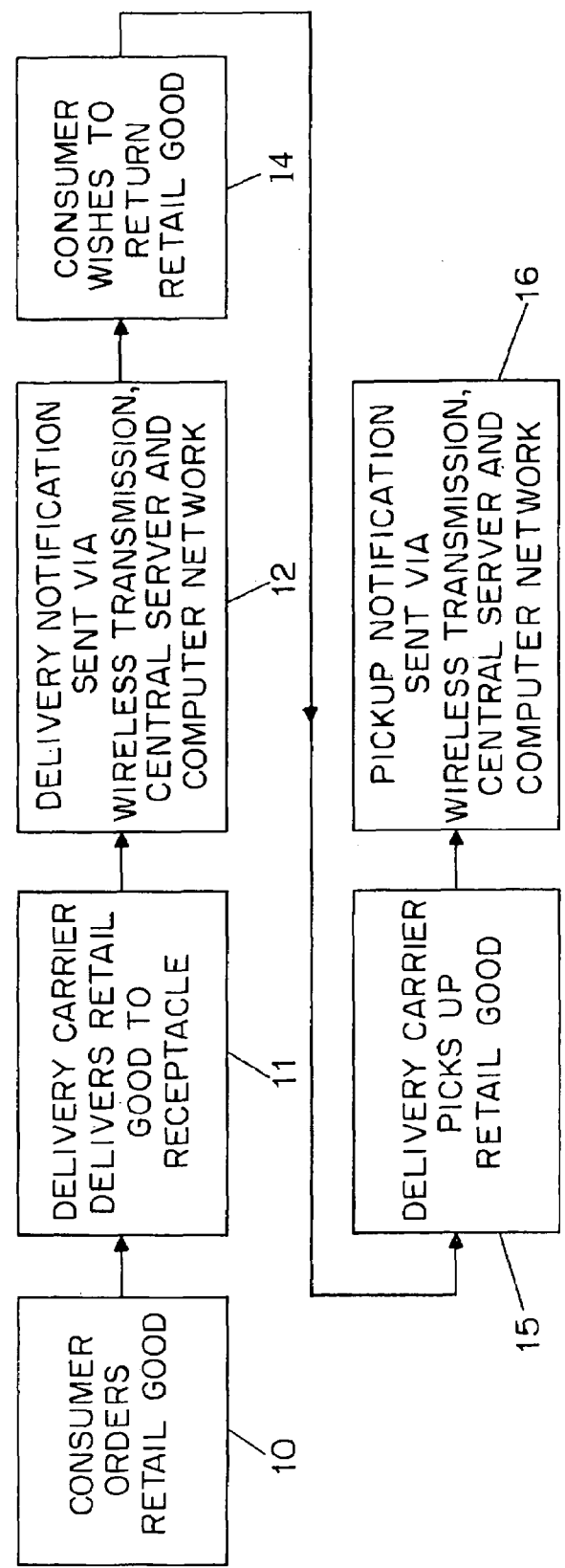

TESTING METHODS FOR USE WITH BOXES

CROSS-REFERENCE TO RELATED APPLICATIONS

This application is a division of U.S. application Ser. No. 10/297,246 filed Dec. 3, 2002, now U.S. Pat. No. 6,820,805, incorporated herein by reference, which is a National Stage filing under 35 U.S.C. 371 of application PCT/US01/18061, filed Jun. 4, 2001, which claims priority from and incorporates by reference U.S. application Ser. Nos. 60/209,149 filed Jun. 3, 2000; 60/228,555 filed Aug. 28, 2000; and 60/245,504 filed Nov. 3, 2000.

BACKGROUND OF THE INVENTION

The present invention relates to the secure transfer of retail goods to a consumer and using a wireless communication system and a computer network to notify the consumer of such transfer via an electronic message.

With demands on people's time seemingly increasing without end, people are always pursuing ways to efficiently accomplish simple, time consuming tasks. Many of these tasks involve shopping trips where only one or two items are immediately needed. Accordingly, services which can deliver goods to a consumer's residence in a short period of time are highly desirable.

The delivery of goods to a consumer's residence, such as through an express mail service, has proven to be problematic at times. Often times, a delivery will be attempted when nobody is home. In such a circumstance, the package can be left outside the residence where it is susceptible to theft, or the package can be taken back with the delivery carrier and delivery attempted at another time. Accordingly, efforts have been made to facilitate the delivery of goods through secured receptacles which would allow parcels to be left at a residence without the threat of theft.

In U.S. Pat. No. 6,138,910, a secured receptacle is disclosed in which a parcel delivered through the mail may be deposited. The secured receptacle also possesses a machine-readable indicium which allows a central server and a paging receiver to notify a person about the delivery of a parcel. A computerized delivery-acceptance system is described in U.S. Pat. No. 5,979,750 in which a computer-controlled access or locking mechanism guarantees secure delivery of packages.

Notification of the delivery of a parcel is also desirable in some circumstances. Several methods and devices are known in the art which serve this purpose. In U.S. Pat. No. 5,786,748, a method is provided for the notification of the delivery of express mail through a wireless page message. In U.S. Pat. No. 5,247,282, an audible or visual signal is generated within a dwelling when mail delivery has been made to that residence.

A storage device that secures goods from theft and exposure to the elements and also provides notification that items have been delivered or removed from the device is disclosed in U.S. Pat. No. 5,774,053. In the preferred embodiment of the invention, a key pad is located on the storage device which allows access through the entry of a specific code. Each specific vendor is given a unique code thereby allowing the owner of the box to be notified of which vendor had visited the storage device. Notifying the owner that a delivery has been made to a storage device occurs through transmitting the vendor code to a remote location through a telecommunications network.

A previous approach to some of these concerns is described in PCT publication WO 01/27740, published Apr. 19, 2001, assigned to the same assignee as the present application, which publication is hereby incorporated herein by reference.

SUMMARY OF THE INVENTION

The present invention is directed towards the logging of openings and closings of a secured storage receptacle to record the transfer of items. The method encompassed by the present invention comprises the following steps:

(a) gaining access to a signal-transmitting receptacle;
(b) transmitting a first confirmation signal to a mobile transmission node;
(c) processing the first confirmation signal at the mobile transmission node;
(c) transmitting a second confirmation signal to a central server; and
(d) notifying a consumer of the delivery with an electronic message.

The above process allows the transfer of items by a delivery carrier using a delivery truck equipped with central processing unit that allows delivery confirmation signals to be received from the signal-transmitting receptacle. The signal transmitted from the signal-transmitting receptacle is coupled to the opening and closing of the e-box.

Once a transfer of items has been confirmed by the central processing unit, a signal is sent from the delivery truck to a remote central server. The central server is connected to the Internet, allowing the consumer to be notified about the transfer through an email message, a posting on a web site, or through an electronic panel within the consumer's residence.

The present invention also encompasses a computerized package transfer system for logging a transfer of a retail good, the computerized package transfer system comprising:

(a) a signal-transmitting receptacle;
(b) a central server;
(c) a wireless transmission path from the signal-transmitting receptacle to the central server for transmitting a transfer confirmation signal from the signal-transmitting receptacle to the central server; and
(d) a computer network system connected to the central server.

In the present invention, the wireless transmission path includes at least one transmission node, namely the delivery vehicle which is capable of receiving and transmitting transfer confirmation signals.

DESCRIPTION OF THE DRAWING

The invention will be described with respect to a drawing in several figures, of which:

FIG. 1 is a flowchart showing a method according to the invention for logging the transfer of a retail good delivered to a consumer;

FIG. 2 is a flowchart showing a method according to the invention for logging the transfer of a retail good involved in a return;

DETAILED DESCRIPTION OF THE INVENTION

Figure 3:
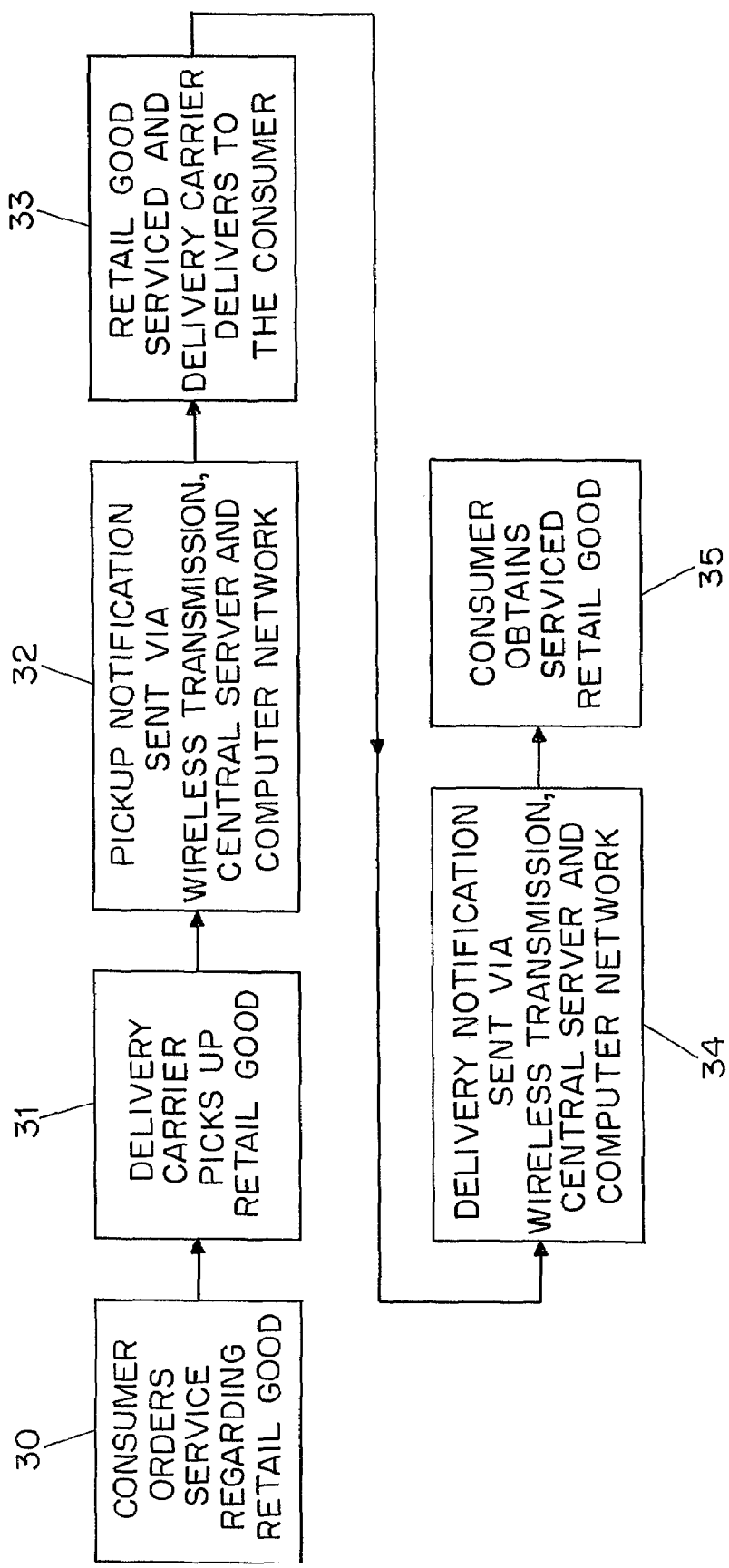
FIG. 3 is a flowchart showing a method according to the invention for logging the transfer of a retail good that is the object of a service.

The present invention is directed to the transfer of retail goods where the consumer is subsequently notified that such transfer has occurred. The notification of the consumer is facilitated through a series of wireless communications and a subsequent electronic communication.

A retail good in the present invention comprises any good or service that a consumer can purchase remotely, such as through the Internet or over the telephone, and involves the delivery or pickup of a tangible item. Such retail goods, for example, include perishable and packaged dry goods. In addition, retail goods include items associated with convenience services. For example, movie rentals and the dry cleaning of clothing are retail goods as envisioned in this invention, although such "products" are closely related to the performance of a service. The present invention contemplates a retail good as anything which can be delivered and picked up at a consumer's residence by a delivery carrier and stored in a signal-transmitting receptacle shown at 60 in FIG. 4. Thus, the present invention contemplates the transfer of retail goods, which includes not only the delivery of items, but also the pickup of items.

The signal-transmitting receptacle also serves as a secured receptacle in order to ensure the safe and reliable delivery of retail goods. There are no limitations on the size of the receptacle other than that the receptacle must be large enough to accommodate the delivery of retail goods. Securing the receptacle involves two variables: securing the interior so that the contents of the receptacle remain safe, and securing the receptacle itself so as to minimize risk of theft regarding the receptacle itself.

Securing the receptacle itself may be accomplished by many means, such as attaching the receptacle to the exterior side of a house or bolting the bottom of the interior to the ground. However, the preferred embodiment of the invention is to secure the bottom of the receptacle to a separate platform base that has a large weight, such as 120 pounds. A platform base of this mass allows the receptacle to be moved relatively easy, yet provides a sufficient deterrent to theft.

The receptacle possesses a locking means to prevent unauthorized access to the receptacle. Several different locking means exist, such as a simple lock and key. In the preferred embodiment of the invention, consumers and delivery carriers use a wireless key to unlock the receptacle. A wireless key may preferably be any type of electronic device known in the art that is capable of transmitting an ultra-low frequency radio wave, whereby the ultra-low frequency radio wave consists of an unlocking signal that is received by a receiving means attached to the receptacle.

The wireless key transmits the unlocking signal which is accepted by the receiving means of the receptacle. While any type of receiving means known in the art can be used, the preferred embodiment is a two-way wireless link which receives the unlocking signal, processes the signal, and inactivates the lock.

While those skilled in the art will recognize that many different electronic embodiments are possible to produce a device that comprises a wireless key, the preferred embodiment is conveniently shaped to be about the size of a credit card. The wireless key possesses an integrated circuit that controls the transmission of the unlocking signal to the receptacle, and a programmable memory for storing the unlocking signal for a delivery carrier or consumer. A programming device is used to program the specific unlocking signal that will be transmitted by the wireless key.

Several types of wireless keys are possible, but the preferred embodiments are a standard wireless key, a high security key and a delivery key. The standard wireless key possess an "open" button that enables any person possessing that wireless key to gain access to the receptacle. The high security wireless key possesses a number pad or key pad for entering a personal identification number. A high security wireless key ensures that mere possession of a wireless key does not permit access to the receptacle and that the person accessing the receptacle must possess an appropriate personal identification number. A delivery wireless key allows a delivery carrier, who needs access to many different receptacles, to conveniently access different receptacles with only one key.

Figure 4:
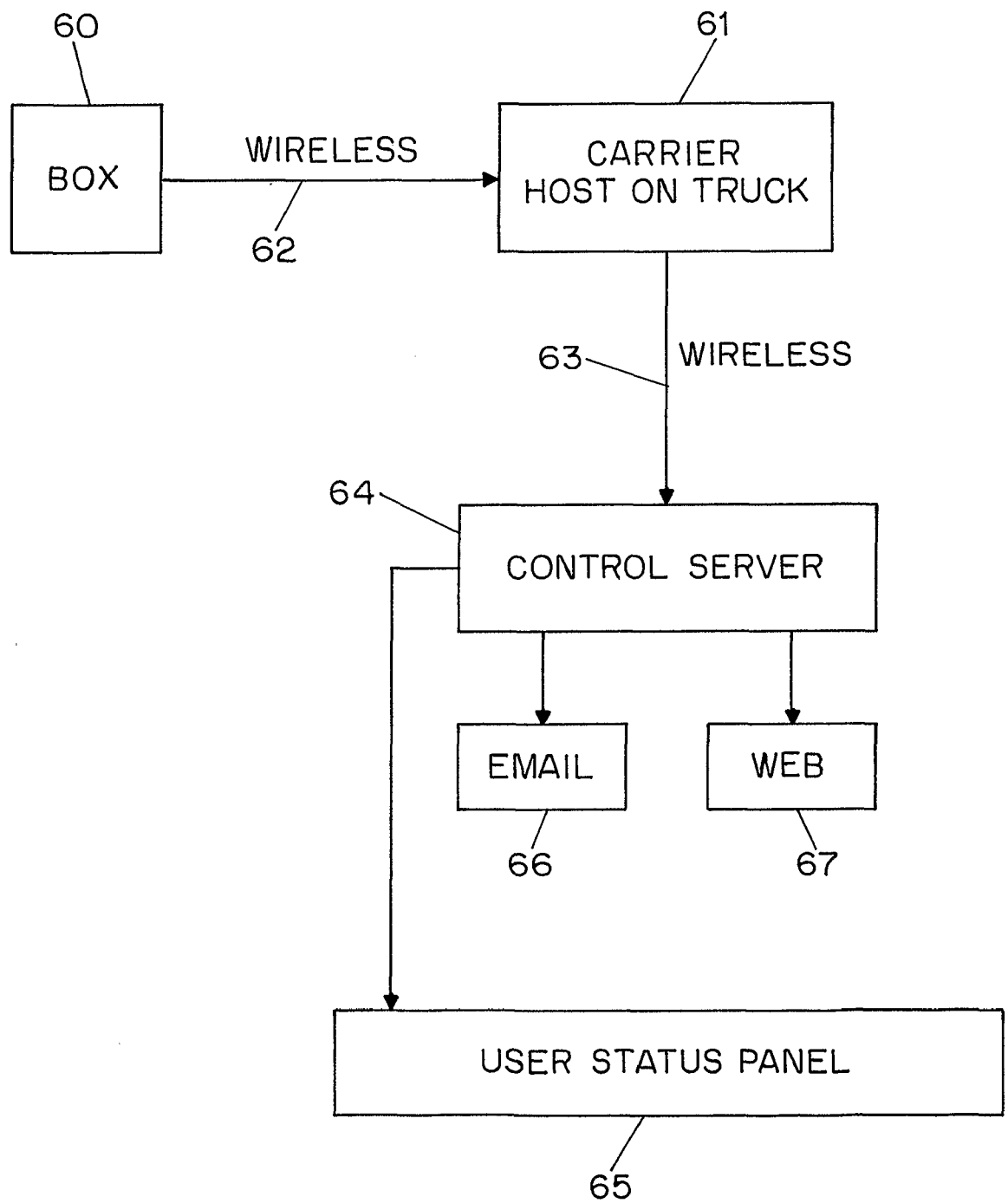
FIG. 4 shows in functional block diagram form the passage of messages in a system according to the invention.
Figure 5:
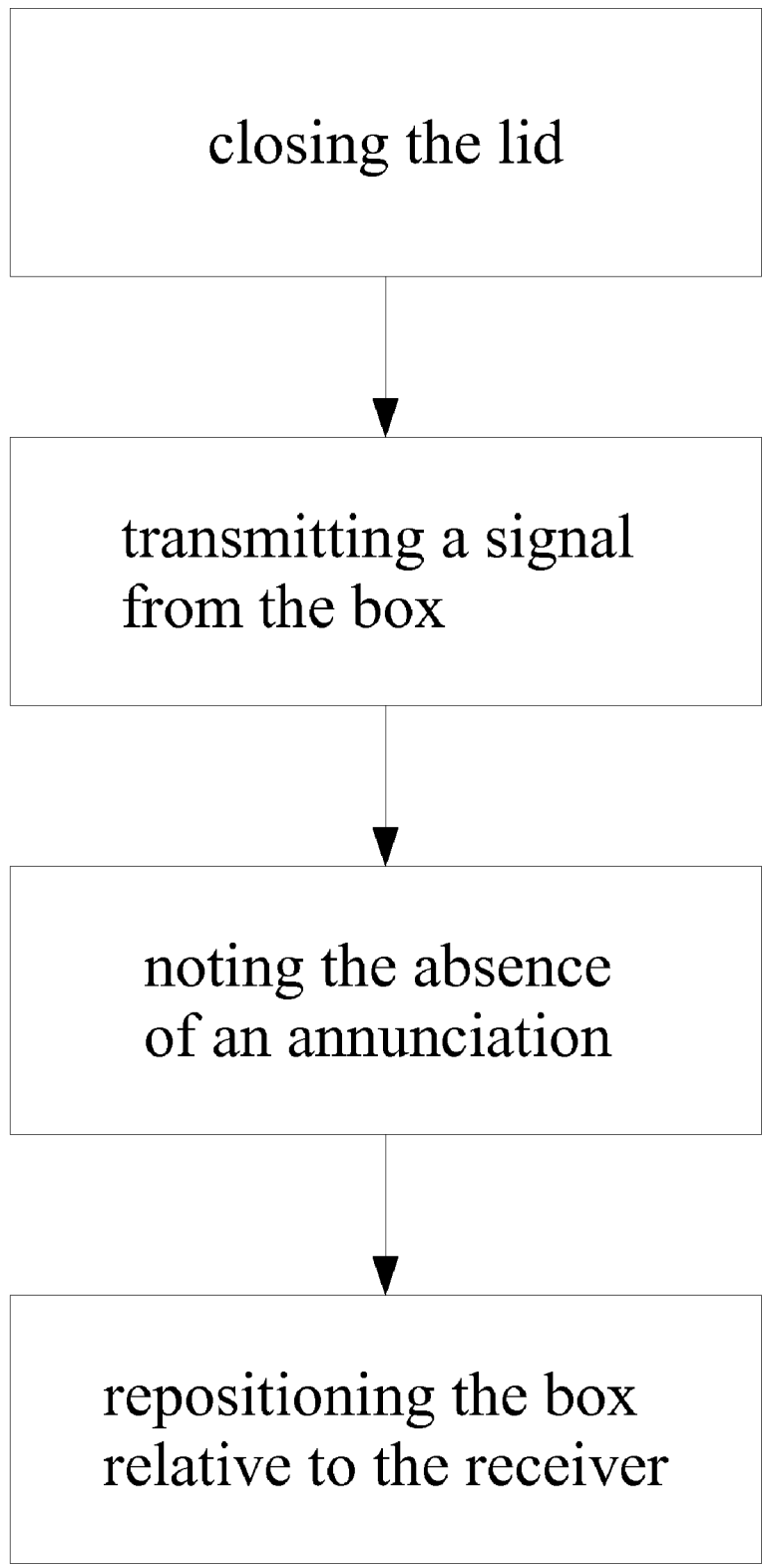
FIGS. 5, 6, and 7 are flowcharts showing methods according to the invention.
Figure 6:
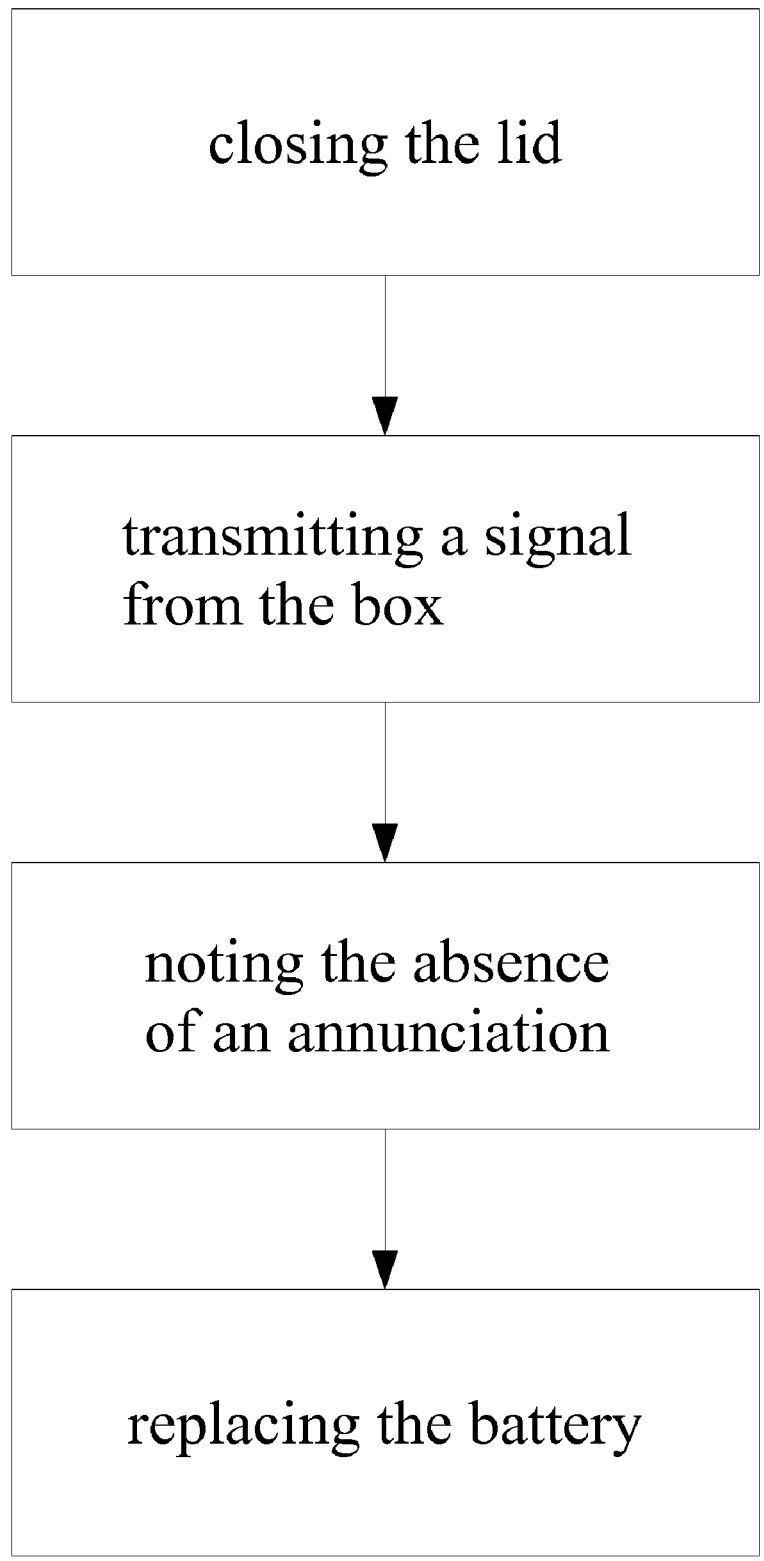
Figure 7:
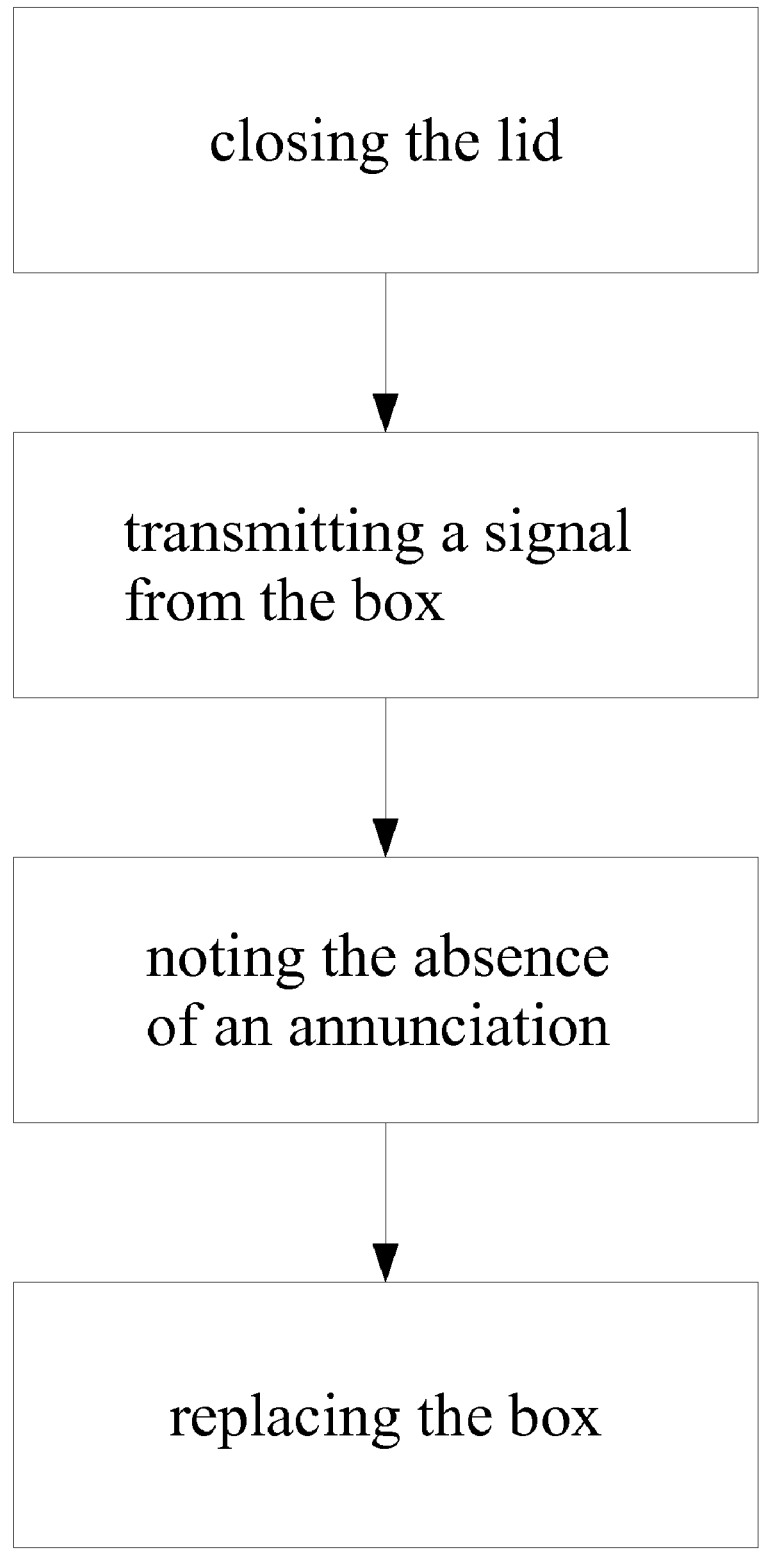

A delivery of the retail good occurs by a delivery carrier and a delivery vehicle, shown at 61 in FIG. 4. A delivery is made when the delivery carrier gains access to a consumer's receptacle using the delivery wireless key, opens the lid, places the retail goods in the receptacle, and re-secures the receptacle by closing the lid. Upon completing the delivery of the retail goods, a series of wireless signals is transmitted from the receptacle to a central server. The central server records the delivery and then sends an electronic communication to the consumer regarding the delivery.

Transmitting the series of wireless signals which notify the central server of the delivery can occur by various means. For instance, a delivery carrier could use a cellular phone, call a telecommunications-central server system, and enter a numerical code indicating the completion of a delivery. The central server would then receive the confirmation numerical code and such confirmation would be recorded by the central server. In this case, only one transmission of a wireless signal in the "series of wireless transmissions" occurs.

The preferred embodiment of the present invention involves the transmission of two wireless signals. The first wireless signal (62 in FIG. 4) is transmitted by way of a printed circuit board with the two-way wireless link that operates at a (preferably) ultra-low frequency. A first antenna integrated with the circuit board receives signals from the wireless key and also transmits the first wireless signal. A "D" size alkaline battery is used to power this end of the two-way wireless link.

The first wireless signal is received by a second antenna coupled with a central processing unit on the delivery carrier's vehicle, shown at 61 in FIG. 4. The central processing unit can be of any kind known in the art, so long as the central processing unit possesses an input means, such as a keyboard or key pad, and an output means, such as a monitor. In a preferred embodiment, the system is used by the delivery carrier to confirm information regarding the delivery, including time, date, and items delivered. Such information is then transmitted by a second wireless transmission (63 in FIG. 4) from the central processing unit 61 to the central server 64. The second wireless transmission may be made by any means known in the art, with the preferred embodiment employing a cellular wireless network, such as the Mobitex network via a RIM 902M Radio Modem that is manufactured by Research in Motion, Ltd.

The second transmission, preferably wireless, can be received by any type of computer system which can process the wireless transmission and record the information associated with the delivery. The preferred embodiment of the invention contemplates a central server that comprises software to handle order taking as well as merchandise returns.

In yet another embodiment, a status panel (65 in FIG. 4) is installed at the customer's premises. The status panel is communicatively coupled to the central computer system according to the invention, for example by means of the Internet. The status panel is able to receive signals from the secure receptacle. It may then pass along information from such signals to the central computer system.

Once a transfer of items has been confirmed by the central processing unit, a signal is sent from the delivery truck to a remote central server. The central server is connected to the Internet, allowing the consumer to be notified about the transfer through an email message (66 in FIG. 4), a posting on a web site (67 in FIG. 4), or through an electronic panel within the consumer's residence (65 in FIG. 4).

The reason for the use of two links will now be described. The transmitter in the box is, as mentioned above, powered by a battery. The battery may be replaceable or may be integrally packaged with the rest of the box. In either case, battery life is a significant concern. The energy budget of the system necessarily includes the energy involved in transmitting data signals from the box to points outside of the box. Depending on antenna configuration and other factors, the amount of power required to transmit a signal to a particular distance may increase as the square of that distance. Indeed for some antenna designs (those approximating a dipole) the power required may increase as the cube of the distance. As a consequence, the system according to the invention attempts to maximize battery life by minimizing the distance over which the first wireless signal needs to be propagated. Most importantly, the communications path from the box to a central computer has at least two links—a first wireless link spanning a limited distance, and a second link spanning a much greater distance.

The delivery truck, which is one choice for the "relay" point between the box and the central system, has a power supply that is large compared with that of the box. This permits wireless transmissions from the truck at far higher power levels than from the box. Similarly, if a receiver in the customer premises is employed as the relay point, it too is likely to have a much larger power supply, such as an AC adaptor connected to the electric power of the house.

It will be appreciated that in the system according to the invention, it is helpful to know whether the box is able to reach the truck or the residential relay point. For this reason, the system preferably has a "test mode" which can be selected, typically at the time of initial installation of the box. In test mode, the box is open, and then closed. Closing the box prompts the box to transmit a signal. If the signal is received, then an annunciation is provided, for example an audible signal. The installer listens for the signal. If the signal is not heard, then the installer may consider repositioning the box, checking its battery, or installing a different box, perhaps one with a different antenna configuration.

As mentioned above, the customer may be notified of the delivery through any type of electronic messaging known in the art. Such methods include paging or a recorded telephone message. The preferred embodiment of the current invention contemplates the sending of one or more of the following electronic messages to notify the consumer of the delivery: 1) an e-mail message that is sent to the customer, 2) an electronic message that is posted on a web site wherein the customer can gain access to the web site and view the electronic message, and 3) an electronic message that may be posted to an electronic panel located within the customer's residence.

In one embodiment, the present invention is directed at a method and system for logging the transfer of a retail good.

In one embodiment of the invention, a consumer purchases from a seller a retail good by via a telecommunications means, such as the Internet. This is shown for example at 10 in FIGS. 1 or 2. The seller subsequently sends a purchase confirmation e-mail message to the consumer. To deliver the retail good, a delivery vehicle is dispatched to a signal-transmitting receptacle that is used by the consumer.

The delivery carrier gains access to the signal-transmitting receptacle by use of a delivery access key. The delivery carrier places the retail good in the signal-transmitting receptacle and closes the signal-transmitting receptacle. This is shown at 11 in FIGS. 1 or 2. After closing the receptacle, a first wireless signal is transmitted from the signal-transmitting receptacle via a two-way wireless link.

The first wireless signal is received by a transmission node on the delivery truck, the transmission node comprising a central processing unit and an antenna. The central processing unit on the delivery truck presents to the delivery carrier information regarding the delivery, such as a date and a time of the delivery and a serial number associated with the delivery wireless key used by the delivery carrier to gain access to the receptacle. Upon the confirming the data, the delivery information is transmitted through a second wireless signal via a cellular wireless network from the central processing unit to a central server. This is shown at 12 in FIGS. 1 or 2.

The consumer is notified of the delivery from the central server by an electronic message, such as an e-mail, a message on the status panel, or a posting on a web site. The consumer subsequently gains access to the signal-transmitting receptacle with a user wireless access key. The consumer removes the retail good from the receptacle, closes the receptacle, and, inspects the retail good. This is shown at 13 in FIG. 1.

Upon discovering the retail good need to be returned for some reason, the consumer informs the seller the retail good needs to be returned to the seller. This is shown at 14 in FIG. 2. The seller acknowledges that the retail good will be accepted for return by the seller. Thereafter, the consumer gains access to the receptacle with the user wireless key, places the retail good to be returned in the receptacle by the consumer, and closes the receptacle.

The delivery carrier drives the delivery vehicle to the receptacle used by the consumer and gains access to the receptacle using the delivery wireless key. The delivery carrier removes the retail good from the receptacle and closes the receptacle. This is shown at 15 in FIG. 2.

Upon closing the receptacle, the first wireless signal is received by the transmission node on the delivery truck. The central processing unit on the delivery truck presents to the delivery carrier information regarding the pickup, such as a date and a time of the pickup and a serial number associated with the delivery wireless key used by the delivery carrier to gain access to the receptacle.

Upon the confirming the data, the delivery information is transmitted through the second wireless signal via the cellular wireless network from the central processing unit to the central server. The consumer is notified of the pickup from the central server by an electronic message, such as an e-mail, a message on the status panel, or a posting on a web site. This is shown at 16 in FIG. 2.

In another embodiment, the present invention is directed at a method and system for logging a transfer of a retail good that is associated with a service provided by a seller, such as dry cleaning. In one embodiment of the invention, a consumer purchases a service through the Internet or a telephone order from a seller wherein the seller will perform a service upon the retail good of the consumer. This is shown at 30 in FIG. 3. For instance, the consumer may wish to have the seller dry clean a suit.

Upon receiving the order, the seller sends a purchase confirmation e-mail message to the consumer. The consumer then gains access to a signal-transmitting receptacle by a user wireless key. The consumer then places the retail good in the receptacle and closes the receptacle.

A delivery vehicle is dispatched by the seller and is driven by a delivery carrier to the receptacle used by the consumer. The delivery carrier gains access to the receptacle by using a delivery wireless key. The delivery carrier removes the retail good in the receptacle and closes the receptacle. This is shown at 31 in FIG. 3.

Upon closing the receptacle, a first wireless signal from the receptacle is transmitted via a two-way wireless link. The first wireless signal is received by a transmission node on the delivery truck, comprising a central processing unit and an antenna. The central processing unit confirms a plurality of data comprising a date and a time of a transfer of the retail good and a serial number associated with the delivery wireless key used by the delivery carrier to gain access to the receptacle. This is shown at 32 in FIG. 3.

When the information is confirmed, the plurality of data is transmitted through a second wireless signal via a cellular wireless network from the central processing unit to a central server. The consumer of the transfer from the central server by an electronic message, such as an e-mail, a posting on a web site, and a message on a status panel at the consumer's residence.

After receiving the retail good, the seller performs the service involving the retail good. Thereafter, the delivery carrier drives the delivery vehicle to the receptacle used by the consumer to return the retail good. The delivery carrier gains access to the receptacle using the delivery wireless key, places the retail good in the receptacle, and closes the receptacle. This is shown at 33 in FIG. 3.

When the receptacle is closed, the first wireless signal from the receptacle is transmitted via the two-way wireless link. The first wireless signal is received by the transmission node on the delivery truck. The central processing unit confirms the plurality of data comprising the date and the time of the transfer of the retail good and the serial number associated with the delivery wireless key used by the delivery carrier to gain access to the receptacle.

When the information is confirmed, the plurality of data is transmitted through the second wireless signal via the cellular wireless network from the central processing unit to the central server. The consumer learns of the transfer from the central server by an electronic message, such as an e-mail, a posting on a web site, and a message on a status panel at the consumer's residence. This is shown at 34 in FIG. 3 The consumer then gains access to the receptacle with the user wireless key, removes the retail good from the receptacle, and closes the receptacle to complete the transaction. This is shown at 35 in FIG. 3.

What is claimed is:

1. A method for use with a box and a receiver, the receiver disposed to annunciate in the event of receipt of a wireless signal, the box having a lid, the box further comprising a transmitter and an antenna, the method comprising the steps of:
   closing the lid;
   transmitting a wireless signal from the box;
   noting the absence of an annunciation; and
   repositioning the box relative to the receiver.

2. A method for use with a box and a receiver, the receiver disposed to annunciate in the event of receipt of a wireless signal, the box having a lid, the box further comprising a transmitter and an antenna, the transmitter powered by a battery, the method comprising the steps of:
   closing the lid;
   transmitting a wireless signal from the box;
   noting the absence of an annunciation; and
   replacing the battery.

3. A method for use with a box and a receiver, the receiver disposed to annunciate in the event of receipt of a wireless signal, the box having a lid, the box further comprising a transmitter and an antenna, the method comprising the steps of:
   closing the lid;
   transmitting a wireless signal from the box;
   noting the absence of an annunciation; and
   replacing the box.

* * * * *